Nov. 29, 1966
ØYSTEIN BJØRNDAL
3,288,076
HYDRAULIC MEANS
Filed Jan. 28, 1965
2 Sheets-Sheet 2
–FIG. 2.–
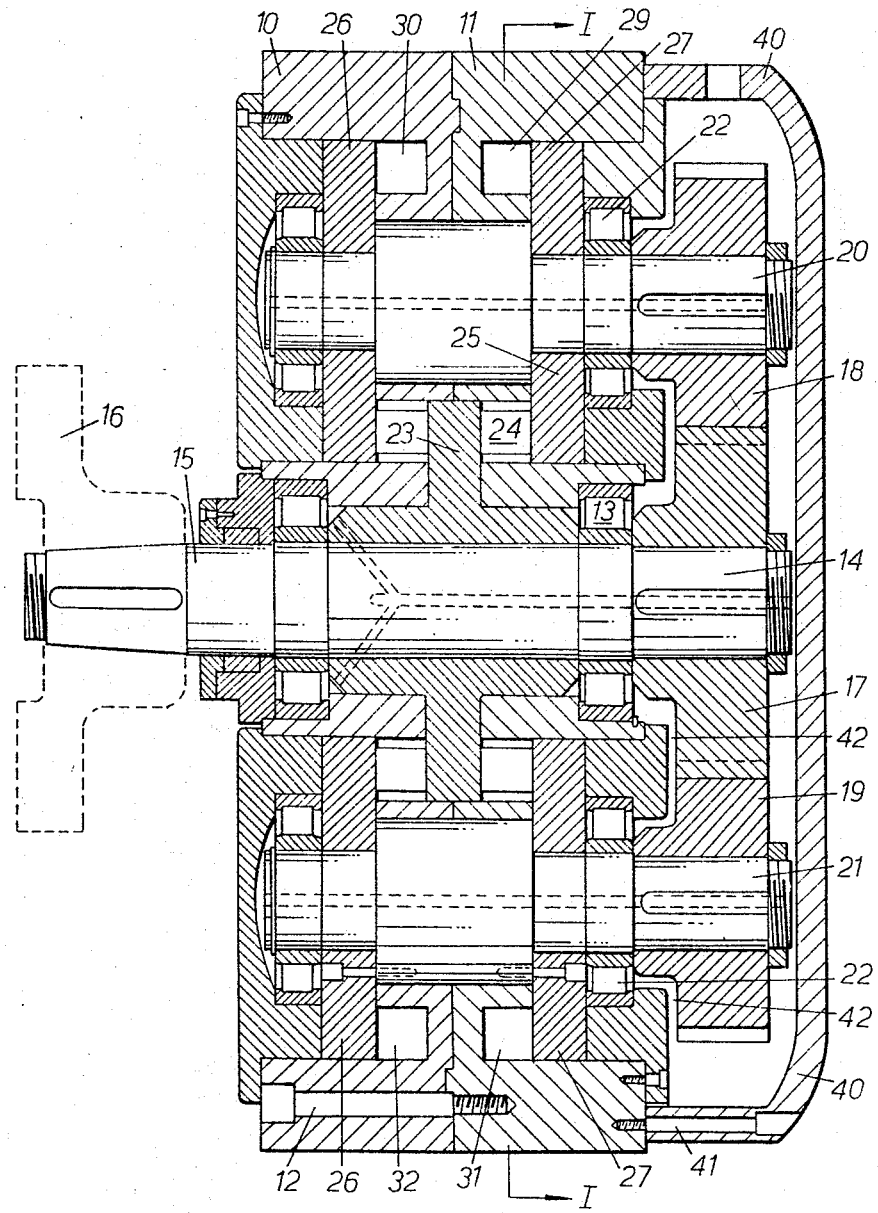

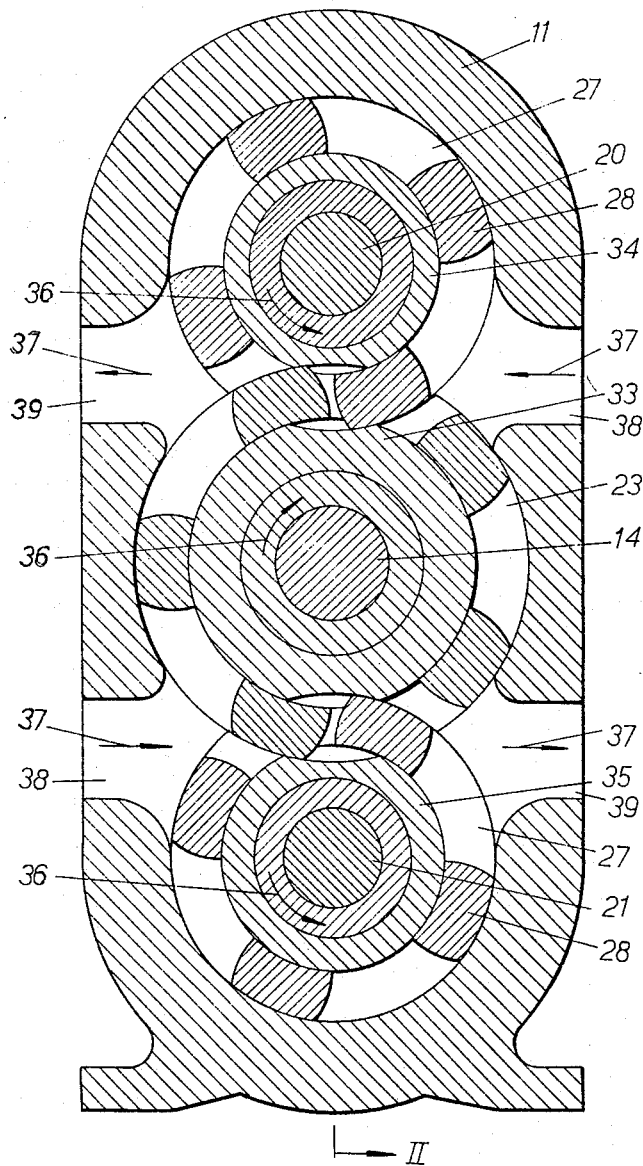

United States Patent Office 3,288,076
Patented Nov. 29, 1966

3,288,076
HYDRAULIC MEANS
Øystein Bjørndal, Telavaag, Hordaland, Norway
Filed Jan. 28, 1965, Ser. No. 428,689
Claims priority, application Norway, Jan. 31, 1964,
151,806
3 Claims. (Cl. 103—126)

This invention relates to hydraulic means and, in particular, hydraulic pumps or motors.

Fluid pumps are known in which two rotors rotate in a common housing having an inner bore with a cross-section shaped substantially like a figure eight, which fits tightly around the rotors and in which each rotor carries at its periphery a plurality of projections which are threaded in between one another at a portion of the peripheries of the rotors which overlap one another. Examples of such pumps are the conventional toothed wheel pumps which comprise two toothed wheels, the teeth of which engage one another and provide the necessary sealing; in these pumps the afore-mentioned projections extend radially outwards from a hub plate.

Prior to the toothed wheel pumps, however, a construction was tried in which two hub plates were arranged so as to be axially displaceable relative to one another and were provided with axial projections, the projections on the one plate extending towards and being threaded in between the projections of the other plate. From the theoretical point of view, good sealing was more easily obtained, especially at that position where the projections were threaded in between one another.

This latter construction has, however, not been utilised to a great extent in practice and has gradually fallen into disuse. Moreover, a serious disadvantage with this construction was that it was not balanced, this fact forming the basis for many problems.

It is an object of the invention to provide a pump which is balanced both statically and dynamically, being especially suited for the production of high pressures.

It is another object of the invention to provide a construction from which it is possible to obtain pumps or motors having a larger number of levels, so that a high capacity can be achieved in a pump or a larger number of levels in a motor.

According to the present invention a hydraulic pump comprises a housing receiving shafts mounted in rotatable engagement and having opposed openings in the walls which constitute an inlet and an outlet for fluid, said rotatable shafts including a first shaft carrying, in spaced apart relation, two plates having opposed sides formed with axially extending projections, and a second shaft arranged parallel to said first shaft and carrying a plate engaging the plates on said first shaft by virtue of projections, extending axially from both surfaces thereof, which are threaded in between projections on the plates of the first shaft, the inlet and the outlet being located at approximately the same level as the threaded plate projections of the first and second shafts and the disposition of the projections relative to the walls of the housing providing a minimal clearance therebetween, the arrangement being such that on rotation of the shafts, fluid is pumped transversely through the housing between the inlet and the outlet.

In order that the invention can be more clearly understood, a convenient embodiment thereof will now be described, by way of example, with reference to the accompanying drawings, in which:

FIGURE 1 is a cross-section of a pump constructed in accordance with the invention, the section being taken on the line I—I of FIGURE 2, and FIGURE 2 is an axial section of the pump shown in FIGURE 1, the section being taken on the line II—II of FIGURE 1.

Referring to the drawings the hydraulic pump or motor has a two-part housing 10 and 11, which is secured together by bolts 12. In the housing there is mounted on roller bearings 13 a central shaft 14, which at one end has a shaft pin 15 which extends outside the housing to be coupled together with a suitable driving means by means of a toothed wheel 16. The other end of the shaft carries a toothed wheel 17 which is engaged to two other toothed wheels 18 and 19 on two shafts 20, 21 which are arranged diametrically opposite to one another each on its respective side of the central shaft 14. These shafts 20 and 21 are mounted in the housing on roller bearings 22.

On the central shaft 14 there is arranged a plate 23, which on both its side faces carries projections 24 received in a cylindrical central channel 25. On each of the shafts 20, 21 there are arranged two plates 26, 27, which carry projections denoted generally by reference numeral 28 on the side which is directed towards the central plate 23. These projections are received in circular outer channels 29, 30 on the shaft 20 and channels 31, 32 on the shaft 21. The projections 28 are fitted tightly into the channels so that there is a minimal clearance between the projections and the walls of the channels. Further, the dimensions of the various projections 24 and 28 are proportioned so that the projections 28 are threaded in between the projections 24 at the positions where the two outer channels 29 and 30 overlap the central channel 25. Further, the outer channels 29, 30 are arranged so that they cut slightly into the stationary portion 33 which surrounds the central shaft 14, and the central channel cuts slightly into the stationary portions 34, 35 which surround the shafts 20 and 21. Likewise it will be observed that the projections 24 and 28 do not contact one another at the overlapping position, there being a definite clearance between them.

It will be seen, that when the parts rotate as is shown by the arrows 36 in FIG. 1, a pumping action will occur in the direction of the arrows 37 in this figure. There are thus formed two diametrically opposed inlets 38 and two diametrically opposed outlets 39.

On operation, the whole mechanism is enclosed in oil, while a cover 40 is secured by bolts 41 to cover over the three toothed wheels, and channels 42 serve to feed oil to the roller bearings.

It will be evident on consideration of FIG. 1, that the pump described herein will operate as a double toothed wheel pump, while the fluid is sucked by the projections 28 when they move in the channels 29, 30. The projections 24 in the channel 25 will also exert such a pumping effect, as they lead the fluid from the feed at the one side, to the discharge at the same side of the housing, seen in FIG. 1.

In addition, it will be evident that the arrangement is balanced in the axial direction and that no axial pressure occurs towards the bearings of the different shafts. The only place where axially directed pressure occurs is at the rear side of the plates 26, 27, but these can, if desired, be furnished with grooves (not shown) on the rear side which can be fed pressure oil for discharge through the grooves through the plates. By this discharge and balancing of the pressure it is possible to allow the pump to work at a substantially higher pressure than has hitherto been usual in hydraulic systems of the present type.

In the present embodiment the laterally disposed shafts are provided with four projections while the central shaft carries five projections, distributed around the periphery. This is purely by way of example, and the number of projections can be the same on all shafts, just as this number can also be increased when this is desired. The one thing which is necessary, is that the distance between two projections must be sufficiently short so that the projections isolate the various chambers from one another.

It will also be observed that the projections 24, 28 do not contact one another at the overlapping position of the channels. This is important if wear is to be avoided at these positions. As the rotation produces positive control of the toothed wheels 17, 18 and 19, this clearance can be maintained, and a pressure discharge is obtained at this overlapping position.

The pump described herein is eminently suitable as a hydraulic motor in hydraulic systems, for example for ships' winches, and it is possible by this to obtain four speed levels in such a motor.

What I claim is:

1. A hydraulic pump which comprises a housing and shafts mounted in rotatable engagement and received therein, said rotatable shafts including two shafts each carrying, in spaced apart relation, two plates having opposed sides formed with axially extending projections, and an intermediate shaft disposed centrally of the housing, parallel to and between said two shafts, said intermediate shaft carrying a plate engaging the plates of both said two shafts by virtue of projections, extending axially from both surfaces thereof, which are threaded in between projections on the plates of said two shafts, the housing having in the walls two pairs of opposed openings, each pair constituting an inlet and an outlet for fluid and being located at approximately the same level as the threaded plate projections of a corresponding one of the pairs of adjacent shafts, and the disposition of the projections relative to the walls of the housing providing a minimal clearance therebetween, the arrangement being such that on rotation of the shafts, fluid is pumped transversely through the housing in opposite directions.

2. A pump according to claim 1, wherein the intermediate shaft is the driving shaft and the other two shafts are driven shafts.

3. A hydraulic pump which comprises a housing and shafts rotatably engaged by means of toothed wheels, said rotatable shafts being received in said housing and including two driven shafts each carrying, in spaced apart relation, two plates having opposed sides formed with axially extending projections, and an intermediate driving shaft disposed centrally of the housing, parallel to and between said two driven shafts, said intermediate shaft carrying a plate engaging the plates of both said two driven shafts by virtue of projections, extending axially from both surfaces thereof, which are threaded in between projections on the plates of said two driven shafts, said toothed wheels maintaining the projections on the plates of said two driven shafts out of contact with the projections on the plate of the intermediate shaft at the position where the paths of the projections cross one another, the housing having in the walls two pairs of opposed openings, each pair constituting an inlet and an outlet for fluid and being located at approximately the same level as the threaded plate projections of a corresponding one of the pairs of adjacent shafts, and the disposition of the projections relative to the walls of the housing providing a minimal clearance therebetween, the arrangement being such that on rotation of the shafts, fluid is pumped transversely through the housing in opposite directions.

References Cited by the Examiner

UNITED STATES PATENTS 1,937,367   11/1963   Vickers _____ 103—126

FOREIGN PATENTS 333,979   8/1930   Great Britain.
521,031   5/1940   Great Britain.

MARK NEWMAN, *Primary Examiner.*

WILBUR J. GOODLIN, *Examiner.*